Oct. 2, 1951     E. A. HALLSTRAND     2,570,117
SHAFT BEARING
Filed Jan. 31, 1946
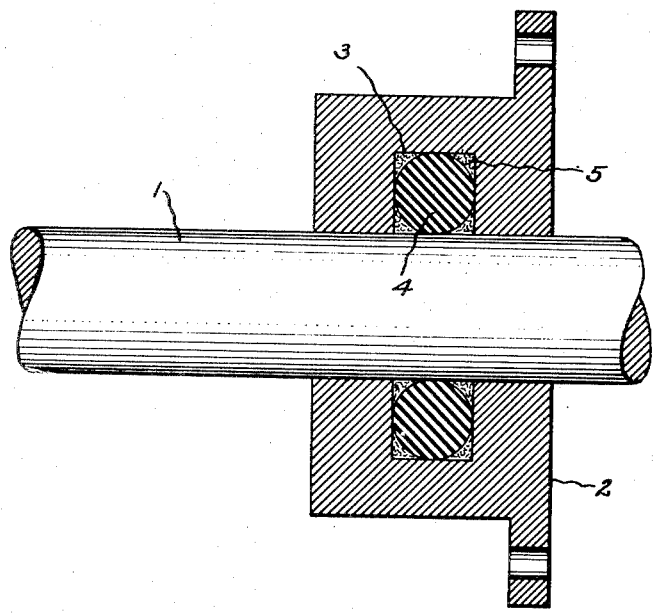
Inventor:
Eric A. Hallstrand,
by *Merton D Mone*
His Attorney.

Patented Oct. 2, 1951

2,570,117

UNITED STATES PATENT OFFICE 2,570,117

SHAFT BEARING

Eric A. Hallstrand, Stratford, Conn., assignor to General Electric Company, a corporation of New York Application January 31, 1946, Serial No. 644,554

2 Claims. (Cl. 308—36.1)

My invention relates to shaft bearings, and more particularly to shaft sealing and lubricating means for rotatable or slidable shafts. The invention is particularly applicable to mechanical or electrical control apparatus having a rotatable or slidable shaft protruding from a pressure-tight housing.

It is a general object of the invention to provide a new and improved pressure sealing and lubricating device for shaft bearings.

It is a more particular object of my invention to provide a new and improved combined shaft seal and lubricating cup for movable control shafts and the like.

My invention itself will be more fully understood and its various objects and advantages further appreciated by referring now to the following detailed specification taken in conjunction with the accompanying drawing, the single figure of which is a cross-sectional view of a shaft bearing embodying my invention.

Referring now to the drawing, I have shown in the single figure a shaft 1 movably mounted in a journal bearing member 2. It will be understood that the shaft 1 may be mounted for rotation, or for longitudinal movement, or both, as desired. The bearing member 2 is formed of a solid body of suitable bearing material, such as metal or the like, and is provided internally with an annular recess 3 of rectangular cross section encircling the shaft 1. Within the recess 3 is positioned a resilient annular gasket 4 of circular cross section. The annular gasket 4 is preferably formed of a suitable oil-resistant synthetic rubber, such as neoprene or a combination of neoprene and Buna N. Preferably, the rubber composition is one which does not expand or contract in the presence of oil or grease.

The cross-sectional diameter of the annular gasket 4 is slightly greater than the depth of the annular recess 3, so that the gasket is slightly compressed between the shaft 1 and the base of the recess 3. Preferably, the recess 3 is of square cross section, so that the annular gasket 4 is compressed also between the sides of the recess and held firmly against the shaft 1. In this way an effective pressure seal is provided.

I utilize the single gasket recess 3 also as a grease groove to supply lubrication gradually to the bearing surface. For this purpose, the voids between the walls of the rectangular recess 3 and the external surface of the circular gasket annulus 4 are filled with a suitable lubricating compound, such as light grease or the like, as at 5. In operation, the grease gradually works its way along the bearing surface to provide lubrication between the shaft and bearing, while the resilient gasket 4 presses firmly against the shaft to provide a pressure seal.

While I have described and illustrated only a preferred embodiment of my invention, many modifications will occur to those skilled in the art and I therefore wish to have it understood that I intend in the appended claims to cover all such modifications as fall within the true spirit and scope of my invention.

What I claim as new and desire to secure by Letters Patent of the United States, is:

1. In combination, a rotatable shaft of circular cross section, a journal bearing element closely surrounding said shaft and having an internal annular recess of rectangular cross section, an annular sealing gasket of oil-resistant synthetic rubber having a circular cross section and positioned within said recess, said gasket having a cross-sectional diameter slightly greater than the depth of said recess and forming an annular pressure seal between said shaft and bearing element, and a body of lubricant substantially filling the voids in said recess and forming an additional pressure seal between said shaft and bearing element.

2. In combination, a circular rotatable shaft, a journal bearing element for said shaft having an internal annular recess of square cross section, an annular gasket of oil-resistant synthetic rubber having a circular cross section and positioned within said recess, said gasket having a cross-sectional diameter slightly greater than the depth and width of said recess, and a body of lubricant substantially filling the voids in said recess.

ERIC A. HALLSTRAND.

REFERENCES CITED

The following references are of record in the file of this patent:

UNITED STATES PATENTS

| Number | Name | Date |
|---|---|---|
| 2,259,648 | Lucas | Oct. 21, 1941 |
| 2,360,735 | Smith | Oct. 17, 1944 |
| 2,362,125 | Eves | Nov. 7, 1944 |
| 2,362,854 | Stephens | Nov. 14, 1944 |
| 2,411,509 | Endebak | Nov. 26, 1946 |
| 2,437,814 | Hallen | Mar. 16, 1948 |

FOREIGN PATENTS

| Number | Country | Date |
|---|---|---|
| 367,183 | Germany | Mar. 4, 1921 |